April 3, 1934.   J. E. PADGETT   1,953,628
SYNCHRONIZING CLUTCH
Original Filed Dec. 23, 1931
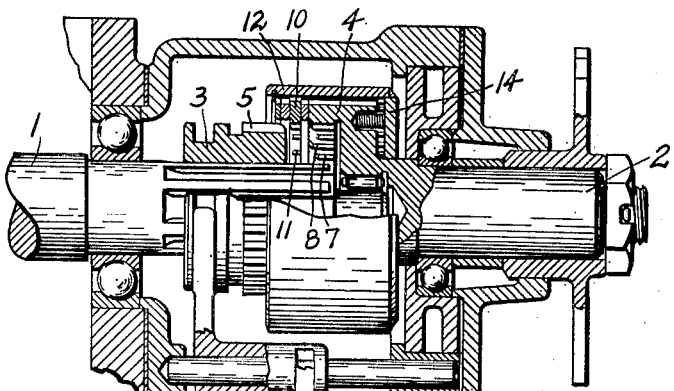
*Fig-1-*
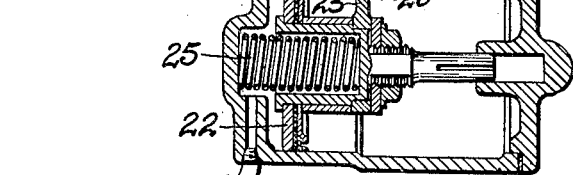
*Fig-2-*
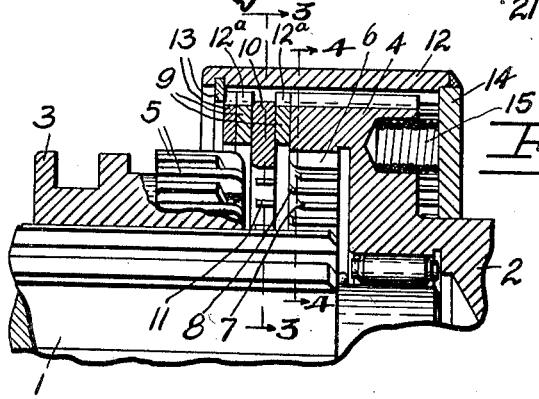
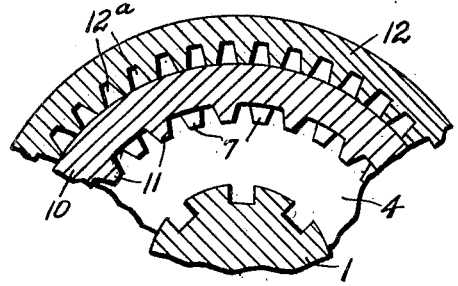
*Fig-3-*
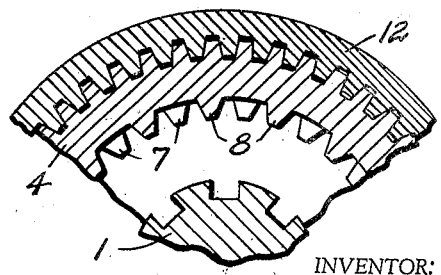
*Fig-4-*
INVENTOR:
Joseph E. Padgett,
BY Bodell & Thompson
ATTORNEYS.

Patented Apr. 3, 1934

1,953,628

UNITED STATES PATENT OFFICE 1,953,628

SYNCHRONIZING CLUTCH

Joseph E. Padgett, Toledo, Ohio, assignor to Spicer Manufacturing Corporation, Toledo, Ohio, a corporation of Virginia Original application December 23, 1931, Serial No. 582,812. Divided and this application June 17, 1932, Serial No. 617,800

10 Claims. (Cl. 192—53)

This invention has for its object a synchronizing clutch including two sections, one of which is shiftable into and out of interlocking engagement with the other, and a friction disk clutch extending between the two sections and rotatable with one of the sections, one of the disks being toothed and arranged in position to be engaged with the teeth of the other section as the sections are brought toward final interlocking, or clutched, engagement.

It further has for its object, an arrangement of the clutch teeth in the two sections, whereby some of the teeth are shorter than others to facilitate the intermeshing of the teeth.

It further has for its object, a clutch in which the sections have long and shorter teeth with a friction disk clutch between the sections, one of the disks of which is toothed to coact with the teeth of one of the clutch sections as the clutch sections are shifted toward final interlocked position.

Other objects appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is a vertical, sectional view through the clutch, the contiguous portion of the operating mechanism therefor being also shown.

Figure 2 is an enlarged, fragmentary view of parts seen in Figure 1.

Figures 3 and 4 are fragmentary detail views of parts of the clutch, taken approximately on lines 3—3 and 4—4, respectively, of Figure 2.

This clutch comprises generally two sections, one of which is shiftable axially into and out of engagement with the other, the clutch sections being formed with teeth arranged to interlock when the clutch is finally engaged, a friction disk clutch interposed between the sections and including sets of interleaved disks, one set being rotatable with one of the sections, preferably the driven, or unshiftable clutch section, and the other set including a disk having teeth for coacting with the teeth of the other clutch section in advance of the engagement of the teeth of the two clutch sections.

The invention further preferably includes clutch sections in which some of the teeth are cut back so they are shorter than others, the longer teeth being spaced equal distance apart, and the shorter teeth interposed between them.

1 and 2 designate two shafts, as driving and driven shafts and 3 and 4 clutch sections rotatable respectively with said shafts 1 and 2, one section, as the section 3 being shiftable axially into and out of engagement with the other section 4. The shaft 1 may be the rear end of the transmission shaft of an automobile gearing, and the shaft 2 a driven shaft which is connected to the propeller shaft of the vehicle, so that the clutch connecting these shafts is what is sometimes called a rear clutch, because located at the rear end of the transmission gearing.

The shiftable clutch section 3 is here shown as splined on the shaft 1 to slide lengthwise thereof, and the shaft 1 has a pilot bearing in the shaft 2, or the clutch section 4 thereon. The shiftable clutch section is operated, as will be hereinafter described. These clutch sections are provided with coacting teeth or jaws, and one of them is provided with external teeth, and the other with internal teeth, the shiftable clutch section 3 being shown as formed with external teeth 5 and the section 4 with internal teeth 6. Some of the teeth of the sections are cut back relatively to the other teeth so that they are shorter than the other teeth, as shown at 7, the longer teeth 8 being spaced equi-distant apart, and the shorter teeth interposed between them. As here shown, there is one short tooth between each pair of long teeth, but obviously a plural number of short teeth may be interposed between any two long teeth. It will be understood that both sections are provided with short and long teeth, and when the sections are being brought into clutching engagement, the long teeth will lap in case the teeth of one section are not alined with the spaces between the teeth of the other section, and relative rotation of the sections will take place until the long teeth of one section abut against the sides of the long teeth of the other section, this positively alining the teeth of one section with the spaces between the teeth of the other section, whereby the complete meshing of the teeth can be completed.

The friction disk synchronizing clutch includes a toothed disk rotatable with one of the sections and arranged to coact with the teeth of the other section before the teeth of the two sections come into engagement, and in the illustrated embodiment of my invention, the toothed friction disk is arranged to come into mesh with the teeth of the clutch section 3 before the teeth of the clutch section 3 engage the teeth of the clutch section 4.

9 designates one set of friction disks, these being rotatable with the section 4, and 10 designates the toothed disk interleaved with the disks 9 and having teeth 11 arranged to coact with the teeth 5 of the shiftable section 3 before the teeth 5 of the shiftable section engage the teeth of the section 4, the disks being spring pressed into engagement with each other. As here shown, the disks 9 are interlocked with a drum 12 enclosing the clutch section 4 and rotatable therewith, the disks being splined thereto at 12ª, this drum having an abutment 13 at one end for the disks 9, and a head 14 at its other end opposed to the rear face of the clutch section 4. Springs 15 are interposed between the clutch section 4 and the head 14 of the drum tending to thrust the drum rearwardly, or to the right in Figures 1 and 2, to press the abutment 13 against the disks 9 to compress them toward the front or left hand face of the clutch section 4.

The teeth of the synchronizing disk 10 are preferably spaced apart two or more times the distance of the teeth of the section 3 to facilitate the interlocking of the teeth of the section 3 with the teeth of the disk 10.

In operation, assuming that the clutch sections 3 and 4 are in their position shown in Figure 2, upon shifting of the clutch section 3 to the right, the teeth thereof will first engage the teeth of the synchronizing disk 10 so that rotary motion is transferred from the section 3 to the section 4, or vice-versa, through the friction disks 9 and 10 which are pressed together by springs 15. During continued movement of the clutch section 3 to the right, the longer teeth of the clutch section 3 will enter into the spaces between the ends of the longer teeth, and in the event the teeth of one section are not alined with the spaces of the teeth of the other section relative rotation will bring the end portions of the longer teeth into lapping engagement, so that now the teeth of both clutch sections are positively and accurately alined, and the section 3 can be shifted to its full extent to the right, Figure 2, carrying the teeth thereof into full engagement with the teeth of the section 4.

Insofar as this invention is concerned, the section 3 may be shifted in any suitable manner. It is here shown as shifted by a fork 20 actuated by power means consisting of a cylinder 21 having a piston 22 therein connected by an arm 23 to the hub 24 of the fork 20. The piston 22 is actuated in one direction by a power fluid against the action of a returning spring 25. The control of, or the operation of the piston, forms no part of this invention, and insofar as this invention is concerned, the fork 20 may be actuated in any manner.

This application is a division of my pending application Ser. No. 582,812, filed December 23, 1931.

What I claim is:

1. A synchronizing clutch comprising coacting clutch sections, one of which is shiftable axially into and out of engagement with the other, said sections being formed with coacting toothed faces, some of the teeth of both sections being cut back relatively to the other teeth, whereby they are shorter than the other teeth, the longer teeth being spaced equi-distance apart, and the shorter teeth located between the longer teeth, and an interleaved friction disk clutch between opposing ends of the sections comprising sets of disks, one set being rotatable with one clutch section, and the other set having teeth for interlocking with the teeth of the other section, as the shiftable section is shifted toward the other section.

2. A synchronizing clutch comprising coacting clutch sections, one of which is shiftable axially into and out of engagement with the other, one section being formed with internal teeth, and the other with external teeth, sets of interleaved friction disks interposed between the sections, one set being rotatable with the section having the internal teeth, and the other set including a disk having internal teeth arranged to coact with the external teeth of the other clutch section, as the shiftable section is shifted toward the other clutch section.

3. A synchronizing clutch comprising coacting clutch sections, one of which is shiftable axially into and out of engagement with the other, one section being formed with internal teeth, and the other with external teeth, sets of interleaved friction disks interposed between the sections, one set being rotatable with the section having the internal teeth, and the other set including a disk having internal teeth arranged to coact with the external teeth of the other clutch section, as the shiftable section is shifted toward the other clutch section, the teeth of the toothed disk being spaced apart a greater distance than the external teeth of the clutch section with which they coact, whereby the spaces between the teeth of the disk are wide enough to receive a plural number of the external teeth.

4. A synchronizing clutch for transmission gearing including coacting sections, one of which is shiftable axially into and out of engagement with the other, said sections having coacting clutch teeth, sets of interleaved disks, one set being rotatable with the unshiftable clutch section, and the other set including a disk having teeth for coacting with the teeth of the shiftable section as the shiftable section is shifted into engagement with the other section, said toothed disk being arranged to coact with the shiftable section in advance of the engagement of the teeth of the shiftable section with the teeth of the other section, and means for compressing the disks, some of the teeth of both clutch sections being cut back relatively to the other teeth, whereby they are shorter than the other teeth, the longer teeth being spaced equi-distance apart, and the shorter teeth being located between them.

5. A synchronizing clutch including coacting sections, one of which is shiftable axially into and out of engagement with the other, said sections having coacting clutch teeth, sets of interleaved friction disks, one set being rotatable with the unshiftable section, and the other set including a disk having teeth for coacting with the teeth of the shiftable section and normally out of engagement therewith and arranged to be engaged thereby in advance of the engagement of the teeth of the shiftable section with the teeth of the other section, and means for compressing the disks, the teeth of the disk being spaced apart a greater distance than the teeth of the shiftable section, some of the teeth of both clutch sections being cut back relatively to the other teeth, whereby they are shorter than the other teeth, the longer teeth being spaced equi-distance apart, and the shorter teeth being located between them.

6. A synchronizing clutch for transmission gearing comprising coacting clutch sections, one of which is shiftable into and out of engagement with the other, the shiftable section having external clutch teeth, and the other section having internal clutch teeth for coacting with the teeth of the shiftable sections, a drum enclosing and rotatable with said other section and having a back wall and an abutment at its front end opposed to the front of said other section and spaced therefrom, sets of interleaved friction disks, one set including disks interlocked with the drum and one of the latter disks thrusting against the abutment, and the other against the unshiftable section, the other set including a disk having internal teeth for coacting with the teeth of the shiftable section, and spring means interposed between the fixed section and the back wall of the drum.

7. A synchronizing clutch comprising coacting sections, one of which is shiftable axially into and out of engagement with the other, said sections having coacting clutch teeth, sets of interleaved friction disks, one set being rotatable with one of the clutch sections, and the other set including a disk having teeth for coacting with the teeth of the other clutch section in advance of the engagement of the teeth of the clutch sections, and means for compressing the disks.

8. A synchronizing clutch comprising coacting sections, one of which is shiftable axially into and out of engagement with the other, said sections having coacting clutch teeth, sets of interleaved friction disks, one set being rotatable with one of the clutch sections, and the other set including a disk having teeth for coacting with the teeth of the other clutch section in advance of the engagement of the teeth of the clutch sections, and means for compressing the disks, the teeth of the toothed disk being spaced apart a greater distance than the teeth of the clutch sections.

9. A synchronizing clutch comprising coacting sections, one of which is shiftable axially into and out of engagement with the other, said sections having coacting clutch teeth, sets of interleaved friction disks, one set being rotatable with one of the clutch sections, and the other set including a disk having teeth for coacting with the teeth of the other clutch section in advance of the engagement of the teeth of the clutch sections, and means for compressing the disks, the teeth of the disk being spaced apart a greater distance than the teeth of the clutch sections, some of the teeth of both sections being cut back relatively to the other teeth, whereby they are shorter than the other teeth, the longer teeth being spaced equi-distance apart, and the shorter teeth located between them.

10. In a synchronizing clutch comprising coacting clutch sections, one of which is shiftable axially into and out of engagement with the other, one section being formed with internal teeth and the other with external teeth, friction clutch means including a member having teeth for interlocking with the section having the internal teeth and the other member having teeth for interlocking with the external teeth of the other clutch section, one of said members having its teeth out of engagement with the clutch section with which it interlocks and being arranged to interlock therewith as the shiftable clutch section is shifted toward the other clutch section, and means for holding the members of the friction clutch sections engaged.

JOSEPH E. PADGETT.